United States Patent
Okmianski et al.

(10) Patent No.: US 7,586,905 B2
(45) Date of Patent: Sep. 8, 2009

(54) METHOD OF DEVICE SERVICE ACTIVATION USING A DISCOVERY MECHANISM

(75) Inventors: Anton Okmianski, Lincoln, MA (US); Allen J. Huotari, Garden Grove, CA (US); Mickael Graham, Lincoln, MA (US); Joshua B. Littlefield, Wellesley, MA (US)

(73) Assignee: Cisco Technology, Inc., San Jose, CA (US)

( * ) Notice: Subject to any disclaimer, the term of this patent is extended or adjusted under 35 U.S.C. 154(b) by 572 days.

(21) Appl. No.: 11/250,938

(22) Filed: Oct. 14, 2005

(65) Prior Publication Data

US 2007/0086357 A1    Apr. 19, 2007

(51) Int. Cl.
*H04L 12/66* (2006.01)

(52) U.S. Cl. ........................ 370/352; 370/254

(58) Field of Classification Search ........ None
See application file for complete search history.

(56) References Cited

U.S. PATENT DOCUMENTS

| 6,891,825 | B1* | 5/2005 | O'Dell et al. ............... 370/352 |
| 7,269,162 | B1* | 9/2007 | Turner ........................ 370/352 |
| 2003/0154398 | A1* | 8/2003 | Eaton et al. ................ 713/201 |
| 2006/0129526 | A1* | 6/2006 | Sitze ............................ 707/2 |
| 2006/0133391 | A1* | 6/2006 | Kang et al. ................ 370/401 |
| 2006/0156362 | A1* | 7/2006 | Perrot ........................ 725/110 |
| 2006/0187858 | A1* | 8/2006 | Kenichi et al. ............. 370/254 |

\* cited by examiner

*Primary Examiner*—Phirin Sam
(74) *Attorney, Agent, or Firm*—Haynes and Boone, LLP.

(57) ABSTRACT

An Internet service device includes data and instructions to generate a user interface to subscribe to an Internet service, and to automatically discover one or more service provider services. The internet service device may receive information indicative of a selected service provider from a user device, and may automatically discover a location of a subscription service and a configuration service for the selected service provider. Automatic discovery of one or more services may be performed using DNS SRV. Device can be automatically identified to service subscription and configuration servers to enable association of subscriber with a device.

18 Claims, 2 Drawing Sheets

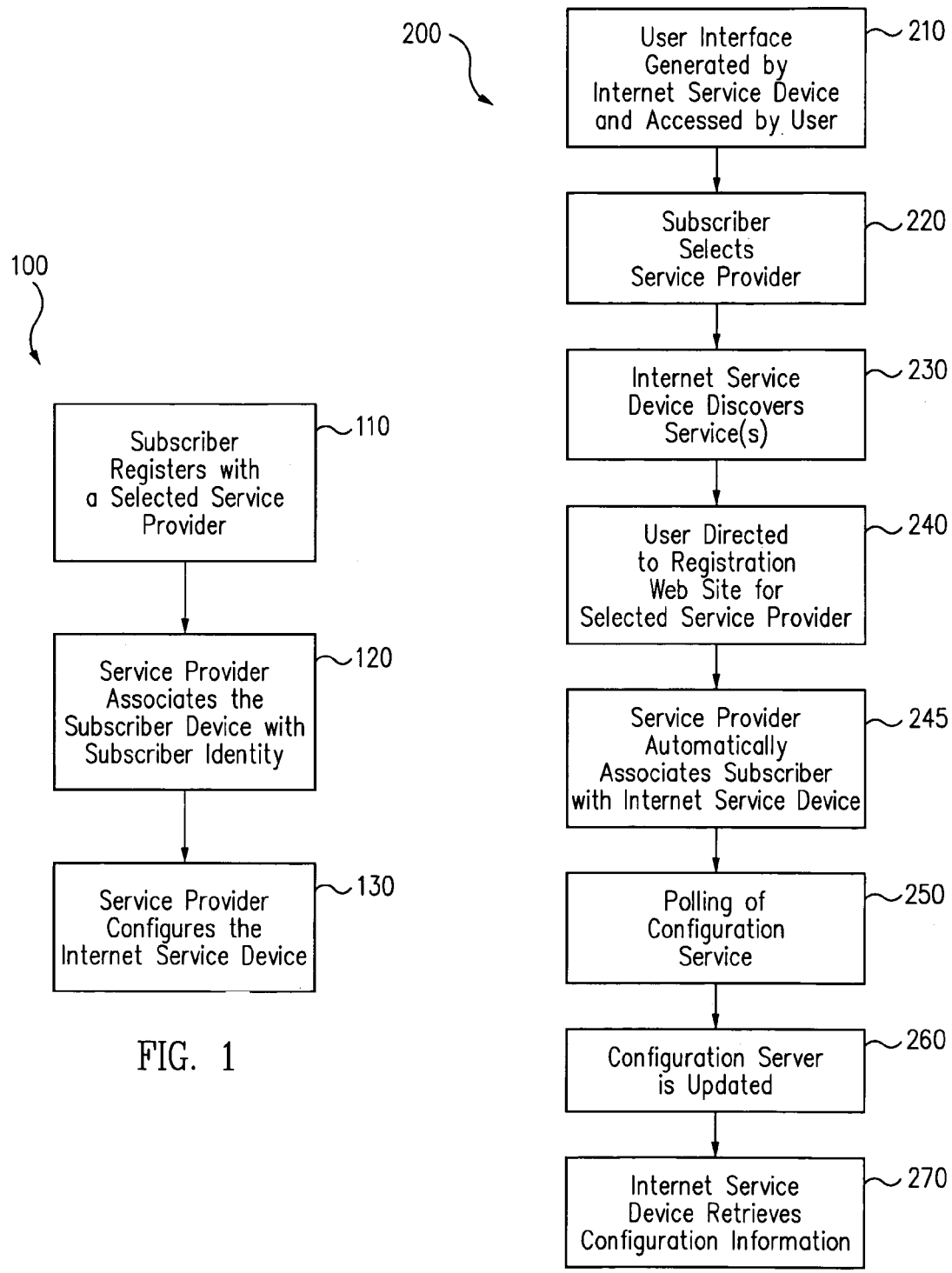

METHOD OF DEVICE SERVICE ACTIVATION USING A DISCOVERY MECHANISM

BACKGROUND

Emerging consumer services such as VoIP (Voice over Internet Protocol) present a unique opportunity to service providers (SPs), as large markets open up in a relatively short time. Larger service providers may have a number of advantages when a new service is introduced to consumers, since they may bundle services with products. For example, Vonage (a VoIP service provider) sells its VoIP services bundled with a Linksys product that is pre-configured exclusively for Vonage. The service provider-specific device is sold to consumers through retail or other channels.

By contrast, smaller service providers generally are not able to bundle their services with Internet service devices (where herein the phrase "Internet service device" refers to a device (or a portion of a device) configured to provide one or more services via an established Internet connection, rather than to provide and/or establish the Internet connection). To subscribe to a service provided by a smaller service provider, a subscriber may need to purchase a non-bundled Internet service device, select a service provider, and then perform an installation process to configure the device to contact the service provider's configuration server.

FIG. 1 shows an example of a process 100 a subscriber may perform to select a service provider after the purchase of a non-bundled Internet service device.

At 110, a subscriber may register with a selected service provider. For example, the subscriber may access a subscription server for the selected service provider via browser access of the Internet. At 120, the service provider associates the subscriber Internet service device with the subscriber identity. One common mechanism for associating the subscriber identity with the identity of the particular Internet service device is for the subscriber to provide the serial number of the device during registration.

At 130, the service provider configures the Internet service device to contact the service provider configuration server. One method that may be used is http redirection, where the subscriber's http request is redirected to the Internet service device's private IP address, with a URL (uniform resource locator) that includes the service provider configuration server location. The Internet service device and the configuration server may then communicate.

A process such as process 100 of FIG. 1 is generally more difficult and complicated than installing an Internet service device pre-configured for a particular service provider. Since ease of installation and use is an important factor for many consumers, larger service providers may enjoy an appreciable advantage in the marketplace.

BRIEF DESCRIPTION OF THE DRAWINGS

FIG. 1 is a process that may be used to subscribe to a service provider, according to the prior art;

FIG. 2 is a process that may be used to subscribe to a service provider, according to some embodiments.

Like reference symbols in the various drawings indicate like elements.

DETAILED DESCRIPTION

Figure 3:
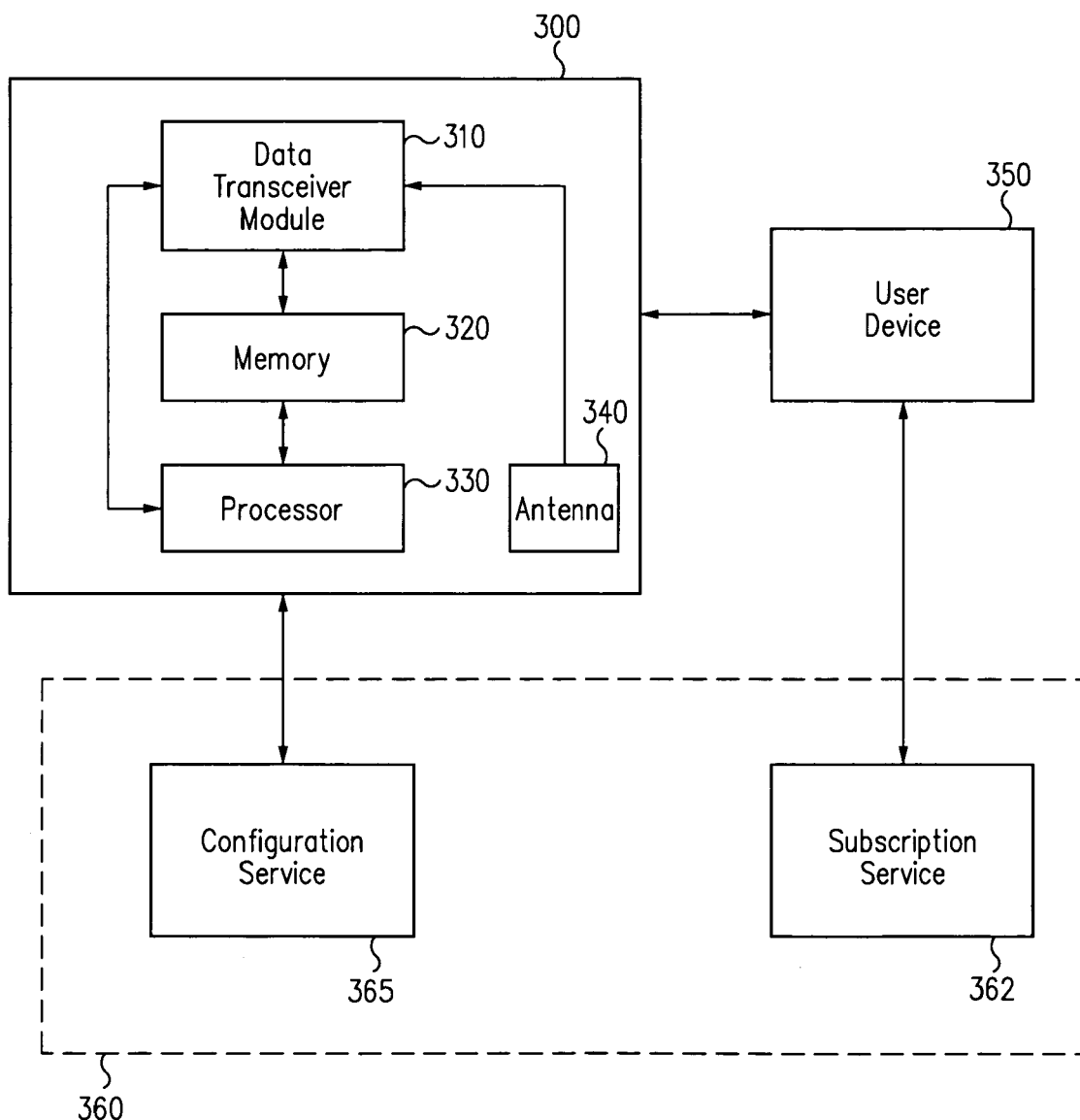
FIG. 3 is a schematic of an Internet service device, according to some embodiments.

As noted above, an installation process such as process 100 of FIG. 1 may be unduly complicated for some subscribers. Additionally, the process may have other unsatisfactory features.

For example, since a subscriber may need to manually enter the serial number of the subscriber's Internet service device, the process is prone to human error. Additionally, some prior art processes may lead to subscriber network configuration problems. The service provider assumes that the Internet service device has a particular fixed IP address. However, if the subscriber is using an Internet service device from one vendor and a gateway from a different vendor, the two vendors may make different assumptions about the subscriber's private network IP address range. As a result, the subscriber may need to reconfigure the gateway to support routing between the subscriber's personal computer and the specific fixed IP address for the Internet service device.

Further, some prior art processes may expose a subscriber to hackers. The subscriber typically needs to enter credentials for the Internet service device mid-way through the registration process, when the http registration request is re-directed to the Internet service device. The subscriber may be fraudulently directed to a different URL by a hacker, and may accept re-direction by clicking "yes" to an authentication prompt and reveal security credentials. The hacker can then break the Internet service device's association with the service provider.

Current systems may also be cumbersome when a subscriber restores the Internet service device to factory default values. The subscriber may need to re-contact the service provider via their web site, and may need to reinstate the association between the Internet service device and the service provider's configuration server by again providing serial number information for the Internet service device.

Systems and techniques provided herein may be used to provide easier, more secure, and less error-prone subscription for non-bundled Internet service devices. FIG. 2 shows a method 200 that may be used to subscribe to a pre-selected service provider using a particular Internet service device.

At 210, the subscriber may access an administrative user interface for the Internet service device, and may authenticate via the user interface. For example, the subscriber may connect the Internet service device to the subscriber's personal computer (where the term "connect" herein refers to establishing an information transmission connection, which may be a wired connection, and/or a wireless connection). A user interface may be generated on the user device, allowing the user to access'subscription data and instructions stored on the Internet service device.

The subscriber personal computer may find the Internet service device location in a number of ways. For example, the location may be determined to be a fixed IP address provided with the Internet service device installation instructions (e.g., printed instructions included with the device). In another example, the Internet service device location may be discovered using a broadcast-style discovery mechanism. Examples of such discovery mechanisms include: UPnP (universal plug and play) discovery initiated through a bundled CD, UPnP discovery initiated through a downloadable application, Windows XP Network Neighborhood UPnP capability, IETF ZeroConf service discovery, and Apple Rendezvous. Other discovery mechanisms may be used.

The user may perform an authentication process via the generated user interface by providing a username and password, which may be provided with the Internet service device instructions (e.g., printed installation instructions). The user may be prompted to change the username and password, to increase system security.

At 220, the subscriber may select a service provider. For example, the Internet service device user interface may present a text field, in which the subscriber enters a domain name of a desired service provider (e.g., "vsp.com"). In some embodiments, one or more drop-down menus including service provider information may be presented to the subscriber to increase the ease of service provider selection.

The user may know of a particular desired service provider, or may access a list of candidate service providers. For example, the Internet service device user interface may include a link to the Internet service device vendor home page, which may list candidate service providers. The candidate service providers may include all service providers known to be compatible with the particular type of Internet service device, may include preferred compatible service providers, and/or may include service providers that may be compatible with a particular service desired by the user.

Once the service provider is selected, one or more DNS service prefixes (such as the prefixes for a subscription server and a configuration server) may be provided to the Internet service device. For example, prefixes may be stored in a memory on the Internet service device, or may be provided by an external source such as the Internet service device vendor web site.

At 230, the Internet service device may use the one or more DNS prefixes and perform a location discovery process for the subscriber registration service, and for the location of the configuration service. For example, the Internet service device may perform two DNS SRV lookups: one for the location of the subscriber registration service and another for the location of the configuration server. DNS SRV (domain name system service location record) is a simple standard mechanism for service discovery. RFC (request for comments) 2782 includes a description of the DNS SRV mechanism.

The DNS SRV mechanism allows the Internet service device to discover the IP address and port corresponding to the particular services of interest (e.g., a subscription service and a configuration service of the selected service provider).

If the services are successfully discovered, the user is directed to the registration website for the selected service provider at 240. One or more warnings may be displayed to the user, which may include information indicating that the user is being redirected to the service provider's web site. The redirection to the registration page includes the Internet service device identifier in the URL, so that service provider systems (e.g., backend systems) can associate the subscriber with the Internet service device. At 245, the service provider automatically associates the subscriber with the Internet service device, using the identifier. In some embodiments, the Internet service device may include the device identifier in an encrypted form for better security. In some embodiments, the Internet service device may include device capability identification information in the URL.

The Internet service device may begin periodic polling for configuration updates from the service provider configuration server at 250. The polling interval for configuration updates may be adjusted as part of initial or subsequent configurations. After the-subscriber registration completes, the configuration server is updated at 260 by service provider systems, and the Internet service device retrieves the configuration information on the next poll at 270. This configuration may be customized for a particular type of device and/or a particular service desired by a user.

The systems and techniques described above may provide for a number of benefits over available systems. One important difference is that the association of the particular Internet service device and the service provider information systems is automatic. Subscribers no longer need to identify and enter the device serial number.

The systems and techniques may also improve a subscriber's ability to change service providers, or to re-establish service with the same provider after device reset. In order to change service providers, the user may simply perform the acts of FIG. 2, specifying the new service provider at 220. Similarly, if the user needs to restore service after re-setting the Internet service device, the user need only select the service provider and re-establish the association of the Internet service device with the configuration server.

There may also be advantages for the Internet service device vendor and/or service provider. For example, in embodiments in which public and service provider DNS infrastructure are used to discover services, the Internet service device vendor need not run infrastructure for service discovery. Additionally (and as noted in RFC 2782), the use of DNS SRV allows service providers to use several servers for a single domain, to move services from host to host with little fuss, and to designate some hosts as primary servers for a service and others as backups. The benefits of the current systems and techniques accrue to both smaller service providers and larger service providers.

FIG. 3 shows a schematic of an Internet service device 300 and its connectivity to other systems that may be used, in some embodiments.

Device 300 may be in communication with one or more user devices 350 such as a subscriber personal computer via a data transceiver module 310. Data transceiver module may comprise one or more wired ports for input from and/or output to other devices, such as the user device 350, may comprise one or more wireless transceiver systems to receive and/or transmit data, and/or may comprise another type of system to receive and/or transmit data. For wireless interconnections (such as WiFi and WiMax interconnections), device 300 may include an antenna 340 in communication with data transceiver module 310.

Data and instructions to generate user interface data for device 300 may be included in a memory 320. Although shown as a single module, memory 320 may include more than one discrete memory module.

Device 300 may receive data at data transceiver module 310 from the user device, indicating that installation of device 300 has been initiated. In response, device 300 may execute instructions stored in memory 320 on processor 330 to generate user interface data, and may transmit user interface data to the user device.

In response to a request from user device 350, a user interface may be presented to the user on a display of user device 350. The user may begin the subscription process prior to contacting a service provider via the service provider web site. The user may interact with user device 350 to select a service provider, and information indicative of the selected service provider may be transmitted to device 300.

In response to receiving service provider information, device 300 may execute instructions stored on memory 320 to perform one or more discovery processes to discover a location of one or more services of the service provider. For example, the instructions may include instructions to perform DNS SRV discovery of a subscription service 362 and a configuration service 365 of the selected service provider information system 360.

After locating subscription service 362, device 300 may transmit data indicative of the subscription service location to user device 350. User device 350 is redirected to subscription service 362 of the selected service provider, with a URL that includes identification information for device 300, where the identification information may be indicative of a device serial number, MAC address, username, and/or other identifier. As a result, service provider information system 360 may automatically associate device 300 with the subscription information.

After re-direction, the user may provide additional subscription information to the service provider; for example, using the service provider's web site. Device 300 may execute instructions to poll configuration service 365 at intervals (e.g., periodically), and when the subscription process is complete, device 300 may retrieve configuration information from configuration service 365 on the next poll.

In implementations, the above described techniques and their variations may be at least partially implemented as computer software instructions. Such instructions may be stored on one or more machine-readable storage media or devices and are executed by, e.g., one or more computer processors, or cause the machine, to perform the described functions and operations.

A number of implementations have been described. Although only a few implementations have been disclosed in detail above, other modifications are possible, and this disclosure is intended to cover all such modifications, and most particularly, any modification which might be predictable to a person having ordinary skill in the art. For example, Internet services devices other than VoIP devices may be used, different user devices may be used (such as cell phones, TV set top boxes, etc.), and the like.

Also, only those claims which use the words "means for" are intended to be interpreted under 35 USC 112, sixth paragraph. Moreover, no limitations from the specification are intended to be read into any claims, unless those limitations are expressly included in the claims. Accordingly, other embodiments are within the scope of following claims.

What is claimed is:

1. A device, comprising:
   a data transceiver to transmit data from and receive data at the device;
   memory in communication with the data transceiver, the memory comprising a machine-readable medium embodying information indicative of instructions that when performed by one or more machines result in operations comprising:
   generating information indicative of a user interface;
   transmitting the information indicative of a user interface to a user device;
   receiving information indicative of a selected service provider from the user device;
   automatically discovering a location of a subscription service for the selected service provider and a configuration service for the selected service provider; and
   transmitting polling information to the configuration service for the selected service provider.

2. A device, comprising:
   a data transceiver to transmit data from and receive data at the device;
   memory in communication with the data transceiver, the memory comprising a machine-readable medium embodying information indicative of instructions that when performed by one or more machines result in operations comprising:
   generating information indicative of a user interface;
   transmitting the information indicative of a user interface to a user device;
   receiving information indicative of a selected service provider from the user device;
   automatically discovering a location of a subscription service for the selected service provider and a configuration service for the selected service provider;
   generating redirection information, the redirection information comprising information indicative of the location of the subscription service and information indicative of an identifier of the Internet service device; and
   transmitting the redirection information to the user device.

3. The device of claim 1, the operations further comprising:
   after completion of a subscription process, receiving configuration information from the configuration service in response to the transmitting the polling information to the configuration service.

4. The device of claim 1, further comprising a processor configured to perform at least some of the instructions, the processor in communication with the memory.

5. The device of claim 1, wherein the device comprises a voice over Internet protocol device.

6. An article comprising a machine-readable medium embodying information indicative of instructions that when performed by one or more machines result in operations comprising:
   generating information indicative of a user interface to receive service provider subscription information at an Internet service device;
   transmitting the information indicative of a user interface to a user device;
   receiving service provider subscription information indicative of a selected service provider from the user device;
   automatically discovering a location of a subscription service for the selected service provider and a configuration service for the selected service provider;
   generating redirection information, the redirection information comprising information indicative of the location of the subscription service and information indicative of an identifier of the Internet service device; and
   transmitting the redirection information to the user device.

7. An article comprising a machine-readable medium embodying information indicative of instructions that when performed by one or more machines result in operations comprising:
   generating information indicative of a user interface to receive service provider subscription information at an Internet service device;
   transmitting the information indicative of a user interface to a user device;
   receiving service provider subscription information indicative of a selected service provider from the user device;
   automatically discovering a location of a subscription service for the selected service provider and a configuration service for the selected service provider; and
   transmitting polling information to the configuration service for the selected service provider.

8. The article of claim 7, the operations further comprising:
after completion of a subscription process, receiving configuration information from the configuration service in response to the transmitting the polling information to the configuration service.

9. The article of claim 6, wherein the service provider is a voice over Internet protocol service provider.

10. An article comprising a machine-readable medium embodying information indicative of instructions that when performed by one or more machines result in operations comprising:
receiving discovery information from an Internet service device at a service provider information system;
transmitting one or more responses to the Internet service device, the one or more responses indicative of a location of a subscription service of the service provider and a configuration service of the service provider;
receiving identifier information for the Internet service device, the identifier information included in a universal resource locator;
receiving subscription information associated with the Internet service device from at least one of the Internet service device and a user device associated with the Internet service device; and
automatically associating the subscription information with the identifier information of the Internet service device.

11. The article of claim 10, wherein the operations further comprising:
receiving polling information from the Internet service device; and
after a subscription process is complete, transmitting configuration information to the Internet service device.

12. The article of claim 10, wherein the service provider is a voice over Internet protocol service provider.

13. A method comprising:
initiating a subscription process for an Internet service provider at an Internet service device;
receiving subscription information from a user device at the Internet service device prior to the user device contacting the Internet service provider;
discovering a location of a subscription service and a configuration service of the Internet service provider;
transmitting location information for the subscription service to a user device;
polling the configuration service of the Internet service provider; and
receiving configuration information from the configuration service of the Internet service provider based on a completed subscription process for the Internet service provider.

14. The method of claim 13, further comprising:
receiving information indicative of a user selection of the Internet service provider at the Internet service device.

15. The method of claim 13, further comprising:
receiving information indicative of a user selection of a different Internet service provider at the Internet service device;
discovering a location of a subscription service and a configuration service of the different Internet service provider; and
transmitting location information for the subscription service of the different Internet service provider to the user device.

16. The method of claim 13, further comprising transmitting redirection information to the user device, the redirection information including an identifier of the Internet service device.

17. The method of claim 13, wherein discovering the location of the subscription service comprises performing a DNS SRV discovery of the subscription service using at least one server prefix associated with the Internet service provider.

18. The method of claim 17, wherein the at least one server prefix comprises a subscription server prefix.

* * * * *